Nov. 1, 1966 C. N. COMPTON 3,282,120
WINDSHIELD WIPER MECHANISM
Filed Dec. 2, 1963 2 Sheets-Sheet 1
FIG.1.
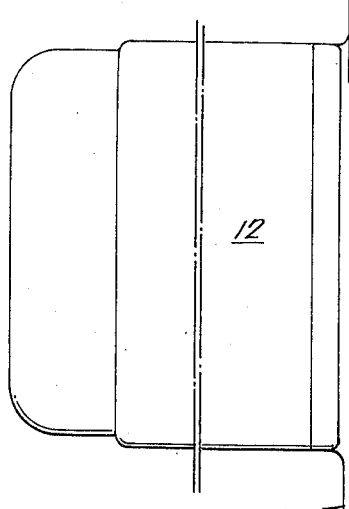
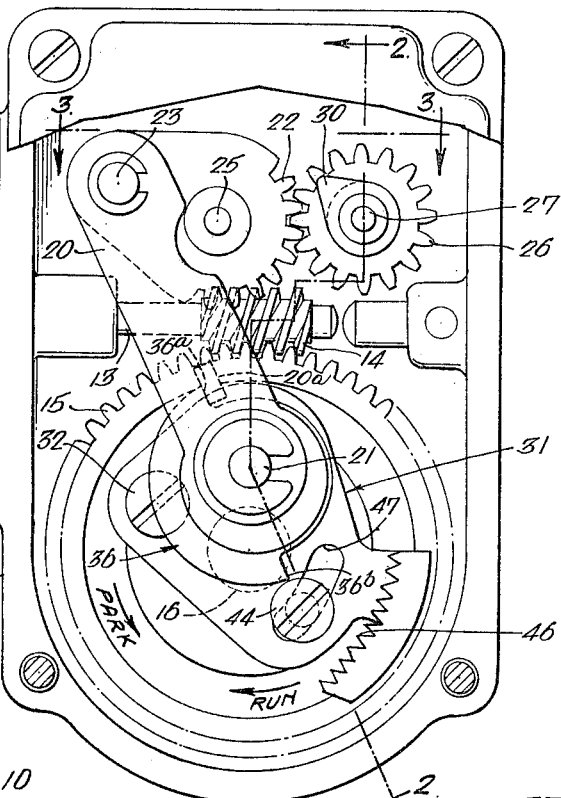
FIG.2.
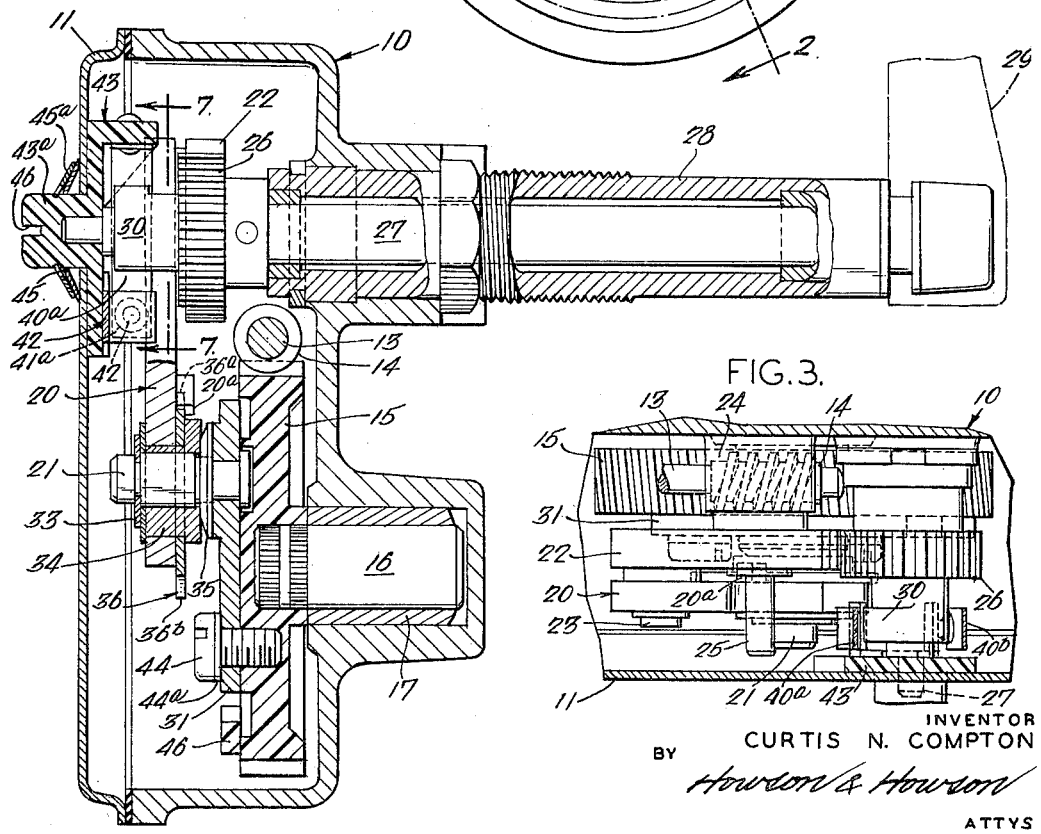
FIG.3.
INVENTOR
CURTIS N. COMPTON
BY Howson & Howson
ATTYS Nov. 1, 1966 C. N. COMPTON 3,282,120
WINDSHIELD WIPER MECHANISM
Filed Dec. 2, 1963 2 Sheets-Sheet 2

INVENTOR:
CURTIS N. COMPTON
BY Howson & Howson
ATTYS.

United States Patent Office 3,282,120
Patented Nov. 1, 1966

3,282,120
WINDSHIELD WIPER MECHANISM
Curtis N. Compton, Wilmer, Ala., assignor to American Bosch Arma Corporation, Columbus, Miss., a corporation of New York
Filed Dec. 2, 1963, Ser. No. 327,330
10 Claims. (Cl. 74—75)

This invention relates to windshield wiper mechanisms and more specifically to such mechanisms which are capable of stopping or parking at a pre-selected position and has for an object providing such a mechanism in which the size of the arc of oscillation of the windshield wiper linkage can be readily varied over a wide range.

In a pending application entitled Windshield Wiper Mechanism, Serial Number 244,217, filed December 12, 1962, which is assigned to the common assignee, there is described a windshield wiper mechanism having various components which function similarly to certain components in the present invention. The invention disclosed in the pending application has many advantages as pointed out therein, but that system has limitations which the present invention is designed to overcome.

According to the present invention a rotatable member adapted to be driven by a motor is provided on a frame. An oscillating link is connected at one of its ends to the rotatable member at a radius from the center of rotation of the rotatable member, and the other end of the link is connected to a gear segment at a radius from its center of rotation so that rotation of the rotatable member drives the gear segment in an oscillatory manner about a shaft supporting the gear segment on the frame. The gear segment meshes with and drives a gear supported on a rotatable shaft so as to move the shaft in a corresponding oscillatory manner suitable for operating a conventional windshield wiper linkage. By this arrangement the arc of oscillation of the shaft upon which the gear and windshield wiper linkage are supported can be greatly varied through the use of various gear ratios in the gear train formed by the gear segment and gear. Also, use of such a gear train, as opposed to an oscillating link connected through a crank arm directly to the rotatable shaft, for driving the windshield wiper linkage eliminates the locking or buckling conditions which may otherwise result when a large angle of oscillation is to be provided. Thus, by means of the gear train driving the output shaft, larger angles of oscillation of the windshield wiper linkage are made available than heretofore possible in prior-art windshield wiper mechanisms.

In accordance with a further feature of the present invention, a novel and convenient means is provided for adjusting the arc of oscillation of the windshield wiper linkage by effectively changing the distance from the center of rotation of the rotatable member to the point at which the actuating link is connected. In order to achieve the desired result the actuating link is connected to the rotatable member by way of an intermediate linkage on the rotatable member, which linkage is pivotally adjustable about an axis spaced from the center of rotation of the rotatable member. Pivoted adjustment of the latter linkage therefore changes the radial distance from the axis of rotation of the rotatable member to the point at which the end of the actuating link is fastened to the rotatable member, and thereby changes the effective distance which the actuating link moves in response to rotation of the rotatable member. This in turn changes the arc of oscillation of the windshield wiper linkage.

For a better understanding of the present invention reference is made to the following drawings in which:

FIG. 1 is a elevational view from the back of the windshield wiper mechanism with the drive motor foreshortened and with part of the casing containing the mechanism broken away;

FIG. 2 is a sectional view taken along the lines 2—2 of FIG. 1;

FIG. 3 is a partial sectional view taken along line 3—3 of FIG. 1;

Figure 4:
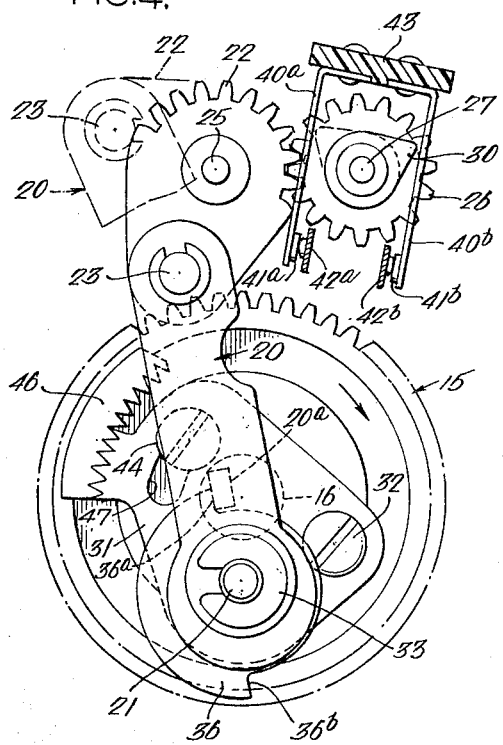
FIG. 4 is an elevational view showing part of the mechanism in extreme positions assumed in the course of rotation of the rotatable member in one direction.

Referring to FIGS. 1 and 2, it will be seen that the mechanism is housed in a casing generally designated 10 which may be molded or cast in any known appropriate manner. One side of the casing is closed by a sheet metal cover 11 fastened to the casing 10 by screws or other suitable connection means. A suitable drive motor 12, ordinarily a direct current motor, is provided and in this case it is preferably a direct current motor capable of reversing its direction of rotation in response to reversal of the direction of current through one of its windings.

As is conventional in systems of this type, the motor shaft 13 is provided with a helical worm 14 which meshes with and drives a larger rotatable gear 15, here supported on an integral shaft 16 suitably journaled in a bearing 17 within a preformed portion of the housing 10. The rotatable gear 15 drives an actuating link 20 through a suitable pivot stud 21 having an axis spaced from but parallel to the axis of the rotatable gear. A connection of the type described in detail in the above-cited co-pending application is preferably provided between the stud 21 and the actuating link 20. Link 20 is connected at its remote end to a gear segment 22 by means of a suitable pin or pivot connection 23 which is displaced from the axis of rotation of the gear segment. Gear segment 22 is fastened to rotate with shaft 25 which is suitably journaled in bearings is a sleeve 24 in an extension of the housing 10. The gear segment 22 meshes with gear 26 which is fastened to rotate shaft 27. Shaft 27 is suitably journaled in bearings in a conventional sleeve 28 provided in an extension of the housing 10 for this purpose. The wiper blade assembly 29 is connected to the end of shaft 27. The geometry of this arrangement is such that, as a motor drives rotatable gear 15 through worm 14, actuating link 20 will be moved reciprocally by stud 21 to cause gear segment 22 to oscillate back and forth through an arc of predetermined angular size. Gear segment 22 meshes with gear 26 in a manner to cause the latter gear to oscillate back and forth through an arc of a size determined by the gear ratio of the gear train comprising gear segment 22 and gear 26. This action preferably produces full oscillation of the windshield wiper blade once each revolution of the rotatable gear 15.

In the above-cited pending application, there is described a windshield wiper mechanism having some parts somewhat similar to some of those preferably employed in the present invention. While the invention disclosed in the previous application has many advantages as pointed out therein, it has the limitation of inability to easily change the angle of the arc of oscillation of the wiper blade assembly, especially over large ranges.

In the apparatus of the present invention, changes in the arc of oscillation may be readily provided by changing the gear ratio in the gear train, comprising gear segment 22 and gear 26, a larger ratio producing a larger arc. For example, if a larger arc is desired a larger gear segment 22 having more teeth, or a similar gear 26 having fewer teeth, is employed.

Figure 6:
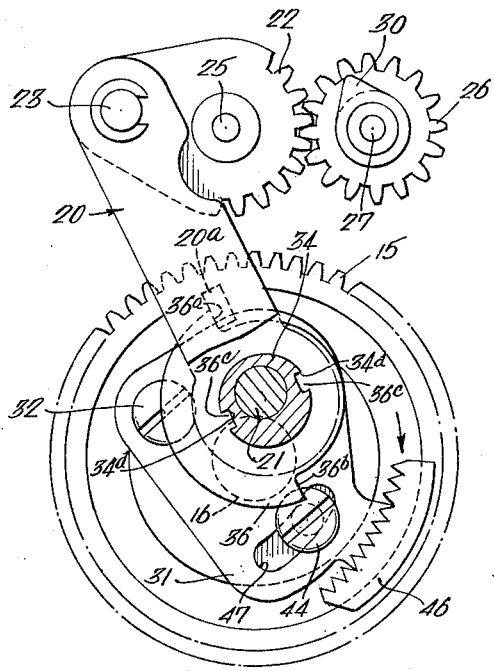
FIG. 6 is an elevational view showing part of the mechanism when the pivoted linkage is in a different position to change the size of the arc denoting the angle of rotation of the wiper arm, and showing part of the actuating link broken away.

A parking arc having an angular size different from the angular size of the arc produced by the mechanism in the "run" condition is achieved by an eccentric bearing arrangement between rotatable gear 15 and the actuating link 20 similar to the one described in the above-cited pending application, or more specifically between stud 21 and link 20, when the mechanism is operated so as to park or stop. More particularly the stud 21 is mounted to rotate with pivoted linkage 31 which is supported on the rotatable member 15 by means of a suitable screw 32 or like means. The eccentric bearing 34, as shown in FIGS. 2 and 6, is placed on the stud 21 between the plate 31 and a retaining ring 33 with a bowed washer 35, the latter washer serving as a spring means to transmit rotational movement from gear 15 to the eccentric bearing 34 and to hold the bearing in place and yet permit slippage between the bearing and the rotatable member when the bearing 34 is held against rotation.

The nature of the eccentric bearing can best be seen in the cross-section view of FIG. 2 which shows the eccentric bearing 34 journaled within the link 20. The link and the eccentric bearing are, of course, rotatable relative to one another. The washer 36, as seen in FIGS. 1 and 2, is fixed to eccentric bearing 34 to rotate with the eccentric bearing 34 and stud 21 relative to gear 15. This is accomplished by virtue of ears 36c on the washer 36, as seen in FIG. 6, which engage within keyways 34d of eccentric bearing 34. Washer 36 has a distinctive shape with shoulders 180 degrees apart separating portions of different radius. The shoulders 36a and 36b alternatively engage opposite sides of lug 20a on link 20.

Preferably the arrangement is such that in normal operation the rotation of gear 15, as viewed in FIG. 1, will be clockwise, as indicated by the arrow marked "run." It will be understood that rotation of rotatable gear 15 in this direction will cause the eccentric bearing 34 and washer 35 to likewise rotate in a clockwise direction as viewed in FIG. 1 until shoulder 36a strikes lug 20a and thereafter to remain in that position since the washer 35 permits slippage therebetween as long as rotation continues in the clockwise direction. The eccentric bearing is affixed in the position determined by the engagement of shoulder 36a against lug 20a on actuating link 20 as shown in FIGS. 1, 4, 5, and 6. Link 20 will have essentially a fixed ratius of rotation relative to gear 15 with the bearing in this position. On the other hand if the direction of the motor is reversed, thereby reversing the direction of the rotatable member 15, shoulder 36b will be driven against the opposite side of lug 20a on link 20 as seen in FIG. 5, thereby effectively moving the radial distance of eccentric bearing 34 relative to the axis of gear 15. This will have the effect of lengthening the arc of oscillation of the windshield wiper to cause the wiper to swing past its normal terminal position at one extreme of its arc. The effects of the latter change in radius are shown by comparison of FIGS. 4 and 5. Such comparison shows the change of terminal position in the arc described by the parking switch actuator 30, which is fastened in a manner to rotate with shaft 27. The parking switch actuator is used to actuate open one of the resilient actuator blades 40a or 40b to cut off the power to the motor, stopping the wipers in a preselected position, when the mechanism is turned off, to be described in detail later. The foregoing operation of the eccentric bearing arrangement is similar to the one described in the above-cited pending application.

In accordance with the present invention a further novel means for changing the arc of oscillation and the position at which the actuator blades may be opened, in addition to the gear train is provided as follows. Stud 21 is mounted to rotate on a selectively pivoted linkage 31. The linkage is pivoted about screw 32. The linkage is adjusted to different angular positions by loosening screw 32 and screw 44 in slot 47 which hold the linkage and washer 44a in a fixed position. It is noted that the linkage is also held in a selected angular position by the toothed member 46 whose teeth mesh with the toothed portion formed in the end of the pivoted linkage. The toothed member is fixed to rotatable gear 15 and rotates with gear 15 as does the pivoted linkage 31. The pivoted linkage is adjusted to a new position by loosening screws 32 and 44, lifting the linkage in order to have it rotatably free of the toothed member, and moving the toothed portion of the pivoted linkage angularly to a new position on the toothed member 46, as shown in FIG. 6. For example, for the direction of change illustrated by FIG. 6, the circle of rotation of the end of link 20 on gear 15 is made smaller, thus making smaller the arc of oscillation of the wiper mechanism, the difference being shown by comparison of FIGS. 4 and 6. Hence, a novel means for changing the arc of oscillation is provided.

Figure 5:
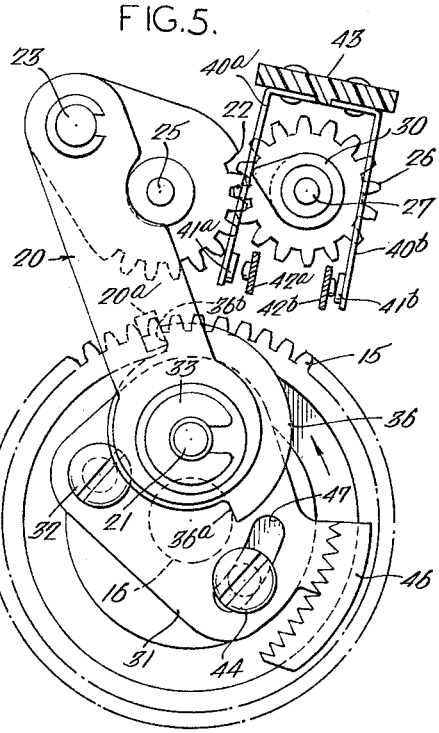
FIG. 5 is an elevational view similar to that of FIG. 4, showing the mechanism in an extreme position when the motor drives the mechanism in the opposite direction.

It can be seen from FIG. 4 that the switch actuator 30 moving through the normal arc in run position may be confined between certain limits which prevent it from striking resilient actuator blades 40a and 40b of limit switches 41a and 41b. The limit switches are preferably mounted on a support structure 42 which has contact support arms 42a and 42b. The support 42 serves as an electrical connection between switches 41a and 41b and thereby connects them in series.

Figure 7:
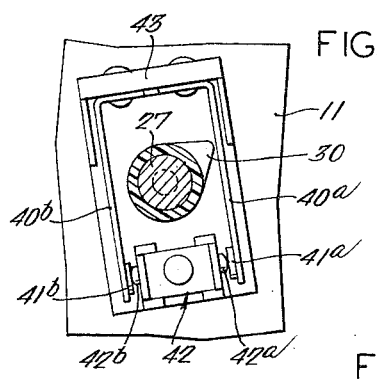
FIG. 7 is a detailed sectional view of the parking switch, taken along lines 7—7 of FIG. 2.

The detailed mechanical structure of the parking switch may be seen in FIGS. 2 and 7. The metallic support structure 42 is preferably sheet metal bent in the manner shown. This support structure 42 is affixed to an insulator member 43 and the resilient actuator blades 40a and 40b are also affixed to the insulator member 43. The insulator member 43 has a projection 43a which extends through the cover 11 and is provided with a screw driver slot 46 (see FIG. 2) for rotational adjustment of the position of the parking switch. The insulator member is held in position on cover 11 by means of spring washer 45 and friction fastener 45a. By this arrangement the insulated member and hence the blades of the parking switch can be adjusted to different positions to change the point at which the actuator 30 will open the blade of the switch. Clockwise rotation of the insulator member as viewed in FIG. 1 will move both actuator blades 40a and 40b sideward to the left and this, for example, will affect the parking position somewhat by making the point at which the blade 40a of switch 41a is opened a little bit later and, therefore the stop position of the wiper a little bit lower. It can have the effect, depending on how far the insulator member was rotated, of completely removing blade 40a of switch 41a and substituting blade 40b of switch 41b in the path of actuator 30. The reverse, of course, is true in the event that the structure is moved counter-clockwise.

Figure 8:
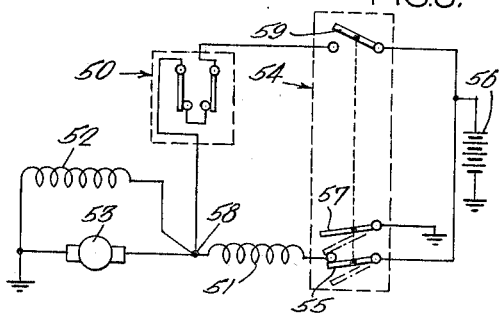
FIG. 8 is a circuit diagram showing a preferred circuit for the drive motor of the present invention.

The preferred circuit for the system and operation of the system is seen in FIG. 8. In this circuit the parking switch, generally designated 50, is shown to be connected to the junction point 58 between the series winding 51 and the parallel winding 52 of the compound wound direct current motor 12, which has an armature 53 in parallel with the winding 52, used to drive the windshield wiper mechanism. The circuit arrangement is such that the manual switch 54 has a normally opened pole 55 which, when closed in the full line position shown, energizes the motor by connecting it in its normal series arrangement to the power source 56. In this position the parking switch plays no part in the operation and the motor operates continuously as a compound wound direct current motor. However, when the switch 54 is turned to its "off" position, series winding 51 which is connected to the direct current power source is then connected to ground through pole 57. Junction point 58 is connected through the parking switch 50 and pole 59 and switch 54 to the battery 56. The other ends of the parallel winding 52 and armature 53 remain connected to ground. This has the effect of maintaining current in the same direction in parallel winding 52 but reversing the direction of current flow in series winding 51 which, however, is thereby placed in parallel with the armature and the parallel winding across the power source. Since the series winding carries more current than the parallel winding, the series winding is made dominant, and the motor reverses its direction and moves slowly in reverse. The reversal of direction causes the change in position of the eccentric bearing 34 in the manner previously described in connection with FIGS. 4 and 5. This reversal changes the effective radius of the pivot connection between rotatable member 15 and link 20 which, in turn, changes the arc of gear segment 22 and wiper arm 27. Thus, the actuator 30 is able to reach the actuator blade, and specifically blade 40a in the situation shown in FIG. 5. One pair of contacts of the parking switch will be opened by the actuator and the circuit to the motor will be thereby interrupted so that the wipers will no be able to move further. Interruption occurs because switches 41a and 41b are in series due to common support and connection member 42 described previously. The wiper will thus park.

It will be obvious that the mechanism can be modified in various respects for the same use. It will be understood that although in the arrangement in the drawings the gear segment has teeth only on one portion, a segment of a gear with teeth around its entire circumference can be used.

Other modifications of the windshield wiper mechanism and its system described herein will occur to those skilled in the art. All such modifications are intended to be within the scope and spirit of the present invention as defined by the appended claims.

I claim:

1. In a windshield wiper mechanism including a rotatable member adapted to be coupled to and driven by a motor, a frame supporting said motor and said rotatable member, an oscillating gear segment supported on said frame, a gear meshing with said gear segment supplying driving motion to a conventional windshield wiper, and an actuating link pivotally connected at one end to said gear segment and at the other end to said rotatable member at a radius from the axis of rotation of said rotatable member, the improvement comprising adjustable connecting means by which said other end of said actuating link is operatively connected with the rotatable member for changing the radius at which said actuating link is pivotally connected to said rotatable member.

2. The windshield wiper mechanism of claim 1 wherein the adjustable connecting means comprises a pivoted linkage to which said other end of said actuating linkage is connected, said pivoted linkage being pivotally connected at one end thereof to said rotatable member at a radius from the axis of rotation of said rotatable member, and adjustable fastening means for holding the other end of said pivoted linkage in different fixed positions on said rotatable member, whereby when said pivoted linkage is pivoted to different ones of said fixed positions the diameter of the circle of rotation of said other end of said actuating linkage will be changed, thus changing the size of the arc of oscillation of said windshield wiper mechanism.

3. The windshield wiper mechanism of claim 2 in which said other end of said pivoted linkage includes a toothed portion and said adjustable fastening means includes a toothed member attached to said rotatable member and meshing with said toothed portion of said pivoted linkage.

4. The windshield wiper mechanism of claim 3 wherein said toothed member is fixedly attached to said rotatable member.

5. The windshield wiper mechanism of claim 4 further comprising means for loosening said pivoted linkage to permit movement of said pivoted linkage to different positions of meshing with said toothed member.

6. In a windshield wiper mechanism including a rotatable member adapted to be coupled to and driven by a motor, a frame supporting said motor and said rotatable member, an actuating link pivotally connected at one end to said rotatable member at a radius from the axis of rotation of said rotatable member, and means connected to and driven by the other end of said actuating link for driving a conventional windshield wiper, the improvement comprising adjustable connecting means by which said one end of said actuating link is operatively connected with the rotatable member for changing the radius at which said actuating link is pivotally connected to said rotatable member.

7. The windshield wiper mechanism of claim 6 wherein the adjustable connecting means comprises a pivoted linkage to which said other end of said actuating linkage is connected, said pivoted linkage being pivotally connected at one end thereof to said rotatable member at a radius from the axis of rotation of said rotatable member, and adjustable fastening means for holding the other end of said pivoted linkage in different fixed positions on said rotatable member, whereby when said pivoted linkage is pivoted to different ones of said fixed positions the diameter of the circle of rotation of said other end of said actuating linkage will be changed, thus changing the size of the arc of oscillation of said windshield wiper mechanism.

8. The windshield wiper mechanism of claim 7 wherein said other end of said pivoted linkage includes a toothed portion and said adjustable fastening means includes a toothed member attached to said rotatable member and meshing with said toothed portion of said pivoted linkage.

9. The windshield wiper mechanism of claim 8 wherein said toothed member is fixedly attached to said rotatable member.

10. The windshield wiper mechanism of claim 9 further comprising means for loosening said pivoted linkage to permit movement of said pivoted linkage to different positions of meshing with said toothed member.

References Cited by the Examiner

UNITED STATES PATENTS

| 214,805 | 4/1879 | Bennett | 74—600 |
| 429,749 | 6/1890 | Wood | 74—600 X |
| 2,121,233 | 6/1938 | Horton | 74—42 X |
| 2,768,530 | 10/1956 | Brundage | 74—75 |
| 2,959,968 | 11/1960 | Gute et al. | 74—70 |
| 3,035,778 | 5/1962 | Kimbro et al. | 74—81 X |
| 3,045,165 | 7/1962 | Littwin | 318—286 |
| 3,127,549 | 3/1964 | Smith | 318—298 |

FRED C. MATTERN, Jr., *Primary Examiner.*

BROUGHTON G. DURHAM, *Examiner.*

F. E. BAKER, *Assistant Examiner.*